(No Model.)
G. W. STAFFORD.
SPINDLE FOR SPINNING MACHINES.
No. 248,062. Patented Oct. 11, 1881.
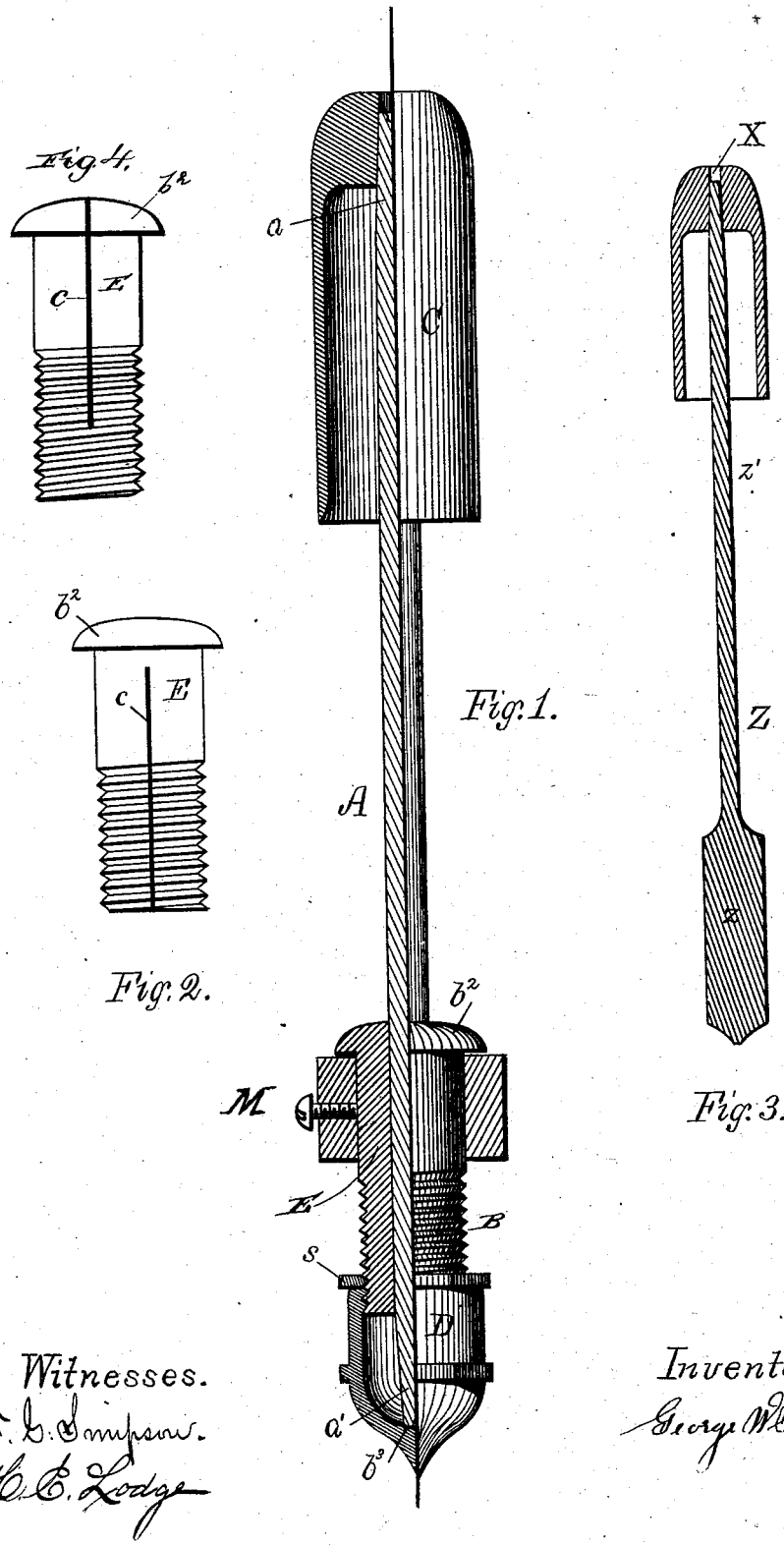

UNITED STATES PATENT OFFICE.

GEORGE W. STAFFORD, OF LAWRENCE, MASSACHUSETTS.

SPINDLE FOR SPINNING-MACHINES.

SPECIFICATION forming part of Letters Patent No. 248,062, dated October 11, 1881.

Application filed March 3, 1881. (No model.)

*To all whom it may concern:*

Be it known that I, GEORGE W. STAFFORD, a citizen of the United States, residing at Lawrence, in the county of Essex and State of Massachusetts, have invented certain new and useful Improvements in Spindles for Spinning-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to increase the durability and serviceability of the spindle on which the cops are wound in worsted-spinning. This object I accomplish by constructing the spindle with a taper at each end, and combining it with a recessed cap which receives the upper end and a base which supports the lower end of the spindle; also, by making the spindle thus combined detachable from said parts; and, finally, employing for the support of the lower end of said spindle a slotted bushing and a nut, which screws thereon, covering the lower end of said bushing and affording a seat for said spindle.

In the accompanying drawings, Figure 1 represents a sectional elevation of my improved spindle with its cap, bushing, and nut. Fig. 2 represents in detail an elastic bushing slotted at its lower end. Fig. 3 is a vertical section of the old form of spindle.

In the form of spindle hitherto chiefly in use for worsted-spinning the spindle Z, Fig. 3, has been made in one piece with its base $z$, the upper end, $z'$, of the spindle being tapered and fitting in a correspondingly-recessed bearing, X, in the cap, and which forms part of the upper end of the cap. Of course the removing and replacing of the cap in doffing about four times per hour causes constant wear between the proximate faces of the end $z'$ and bearing X, and in consequence they cease to fit after a comparatively short time, and a new bearing is required and substituted. To obviate this the practice has prevailed of cutting off the tip of the spindle and turning an equal amount off the butt or base $z$ of the spindle in order to compensate for the loss of length in cutting the tip. This procedure affords temporary relief from the inconvenience above mentioned; but each cutting necessarily shortens the base $z$ of the spindle, so that two cuttings are as many as can practically be made without defeating the very object sought—namely, steadiness of the spindle and cap.

A designates the spindle, which is tapered at its lower end, $a'$, as well as its upper end, $a$, and made detachable from its base B. The latter consists of a cylindrical bushing or sleeve, which may be made in two sections, if desired. It is shown in the drawings as slotted at its lower and unslotted at its upper end, and is provided with the nut D, which engages with screw-threads cut on the outside of the lower end of said sectional bushing, and is intended to act as a base or support for the spindle, and prevents the latter from being driven out of position by the act of replacing the cap. The upper end of this bushing B is enlarged and made convex, as shown at $b^2$.

The bushing B, instead of having threads cut on its exterior perimeter, may be tapped and receive a set-screw, which will take the place of the nut D and act equally well both as a base for support and as an adjuster. The lower end of the nut D is also rounded into an approximation to the sugar-loaf form, and provided with a central bearing-point, $b^3$. When the spindle is in a vertical position, as usual, its end $a$ rests in or against nut D, which then serves as a base for said spindle. A checknut, $s$, may in most cases be used on the bushing, in connection with the nut D, to prevent the latter from working off or starting under the influence of any undue jar or from other causes.

Of course a suitable washer or packing may be interposed between the nut D and the base of the spindle, to make allowance for further adjustment of the nut on the bushing in setting up than if it were not placed there.

The cap is designated by C, and rests upon the tapered bearing of the spindle, as shown at $a$. The wear at this point comes mainly from the act of removing and replacing the cap upon said tapering end $a$. When the latter is too much worn and it is desired to obtain a new bearing the nut D is unscrewed from off the bushing, and the spindle is readily removed therefrom and turned end for end, so that a', which was previously the lower end, will become the upper one and receive the wear in its turn. After both ends have thus become worn till they no longer properly answer their purpose they may be cut down in the usual way. When the spindle is again replaced in its head the nut D is screwed sufficiently upon the bushing to compensate for the amount cut off at both ends of the spindle, so as to be in position to serve as a base, as before stated. This proceeding is not a necessity, however, except when the location of the bushing is unchangeable, as is ordinarily the case. I prefer to let the bushing set in the rail and to fasten it thereto by a set-screw.

By my improvement the spindle is calculated to outwear several spindles constructed according to the old form, and gives much less trouble, since the operation of cutting down occurs but half as often and the substitution of a new spindle for an old one is less frequently required. The rounding of the upper end of the bushing allows the frame to be more easily cleaned and wiped off.

Instead of a bushing in two sections, as before mentioned, I may substitute an elastic bushing split from its lower end to its middle portion; or a bushing in more than two sections may be employed. The former construction is shown in Fig. 2, which represents, in elevation, a bushing having the slot $c$ in its lower portion, its upper portion being unslotted. I have found by experiment, however, that a bushing with the slot cut from the top downward, leaving the lower portion unslotted, as shown in Fig. 4, acts very efficiently, as in the former case (cut from the bottom) it is very necessary to have a snug fit between the spindle and the bore of the bushing; otherwise the spindle is not steady, unless the set-screw passes entirely through the bushing onto the spindle proper, while in cutting from the top down there is a certain spring of the parts of the bushing in pushing the spindle down into place, and when the bushing is fastened in position on the rail by the set-screw these parts are brought together and effectually clamp the spindle, thus securing a perfectly firm union between the parts.

The screw-threaded lower portion of the bushing receives the nut D, before described, which not only serves as a support for the spindle, but also as an adjuster whenever said spindle is cut down. The bushing with split elastic lower end and an unslotted upper part has some advantage over the sectional bushing, in that the said upper part needs no clamping. All parts of the sectional bushing are clamped by the action of the set-screw M through the frame, as shown in Fig. 1, and held quite as securely as if in one piece.

In any case the spindle is of cylindrical form, as is usual, and the internal shape of the bushing corresponds closely thereto.

Other clamping devices may, of course, be substituted for the set-screw in the frame. The spindle may be used for other analogous purposes, as well as for worsted-spinning.

Having thus described my invention, what I claim as new, and desire to secure by Letters Patent, is—

1. A reversible cap-spindle, in combination with a recessed cap, which receives the upper end of said spindle, and a base which supports the lower end of said spindle, substantially as described.

2. In combination with spindle A, a slotted bushing, B, externally screw-threaded, as shown, and a nut, D, adapted to engage therewith and compensate for the shortening of said spindle, substantially as set forth.

3. In combination with a detachable base and cap, a spindle tapered at both ends and having one end inserted in the base and the other in the cap, substantially as set forth.

In testimony whereof I affix my signature in presence of two witnesses.

GEORGE W. STAFFORD.

Witnesses:
H. E. LODGE,
F. G. SIMPSON.